United States Patent [19]

Jones

[11] Patent Number: 4,527,753
[45] Date of Patent: Jul. 9, 1985

[54] DUAL-CONTROL FLY-FISHING REEL

[76] Inventor: Leon Jones, 18192 Gothard St., Huntington Beach, Calif. 92648

[21] Appl. No.: 670,116

[22] Filed: Nov. 9, 1984

Related U.S. Application Data

[63] Continuation of Ser. No. 404,031, Aug. 2, 1982, abandoned.

[51] Int. Cl.$^3$ .............................................. A01K 89/02
[52] U.S. Cl. ............................ 242/84.51 R; 74/577 S
[58] Field of Search ................. 242/84.51 R, 84.51 A, 242/84.1 R, 219; 74/527, 577 R, 577 S, 578; 116/307; 188/166

[56] References Cited

U.S. PATENT DOCUMENTS

| | | | |
|---|---|---|---|
| 790,676 | 5/1905 | Carlton | 242/84.51 R |
| 1,398,189 | 11/1921 | Hodges et al. | 242/84.51 R |
| 1,612,177 | 12/1926 | Catucci | 242/84.1 R |
| 1,637,334 | 8/1927 | Catucci | 242/84.51 R |
| 1,815,382 | 7/1931 | Russell | 242/84.51 R |
| 2,578,978 | 12/1951 | Mandolf et al. | 242/84.51 R |
| 2,633,308 | 3/1953 | Zientowski | 242/84.51 R |
| 3,741,493 | 6/1973 | Jones | 242/84.1 R |
| 3,827,649 | 8/1974 | Payen | 242/84.1 R |
| 3,967,792 | 7/1976 | Goedl | 242/84.1 |
| 4,088,279 | 5/1978 | Karlsson et al. | 242/84.1 R |

FOREIGN PATENT DOCUMENTS

| | | | |
|---|---|---|---|
| 14489 | of 1904 | United Kingdom | 242/84.51 R |
| 132670 | 9/1919 | United Kingdom | 242/84.51 R |

*Primary Examiner*—Billy S. Taylor
*Attorney, Agent, or Firm*—Gausewitz, Carr, Rothenberg & Edwards

[57] ABSTRACT

A fly-fishing reel has a rotatable spool provided with a click gear engaged by a pivoted pawl which can apply resistance to rotation of the spool in opposite directions by independently adjustable spring means. A pair of exteriorly exposed adjustment knobs are each provided with an eccentric pin extending into the reel housing to slide a plate which carries a pretensioned spring engaged with one of the opposite radial sides of the pawl. By rotating the knobs, the slides move linearly to vary the contact point of the springs with the pawl and thereby regulate the moment arm of the force resisting rotation of the pawl and thus the click gear and spool to which is engaged. Since the adjustments are independent, the resistances to rotation of the spool may be varied as to degree and to which direction of rotation they apply. The slides mount the springs in a manner to limit the degree to which the springs may follow movements of the pawls.

19 Claims, 6 Drawing Figures

FIG. 3.
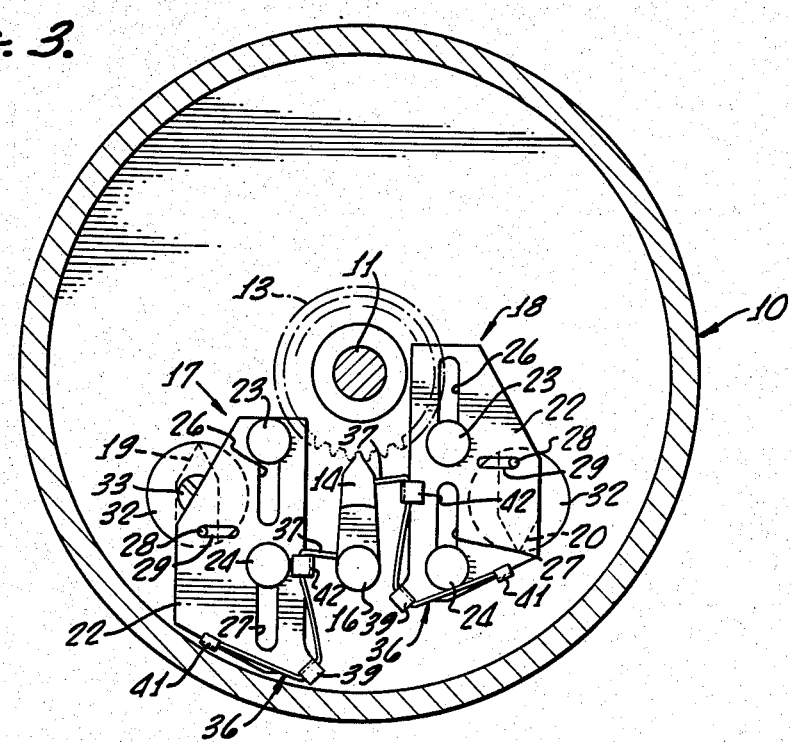
FIG. 4.
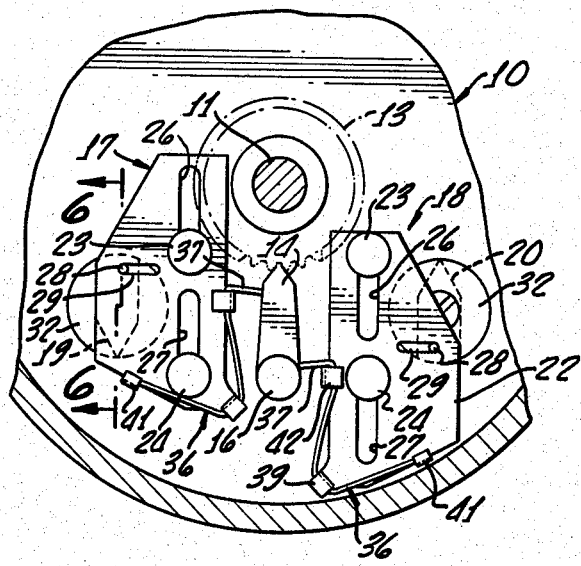
FIG. 5.

DUAL-CONTROL FLY-FISHING REEL

CROSS-REFERENCE TO RELATED APPLICATION

This application is a continuation of my pending patent application Ser. No. 404,031, filed Aug. 2, 1982, for Dual-Control Fly-Fishing Reel, and now abandoned.

BACKGROUND OF THE INVENTION

Over a period of many decades, there have been a host of devices for (1) regulating the resistance to rotation of the spool of a fly-fishing reel, (2) regulating the amount of clicking sound that the spool generates when rotating.

These devices have often been characterized by one or more of the following defects and disadvantages:

(a) inability to achieve a sufficient degree of change in the resistance to spool rotation, and in the clicking sound;

(b) lack of independence of adjustment of resistance to rotation in one direction as distinguished from rotation in the other direction;

(c) necessity of taking the spool out of the housing of the reel in order to change the resistance to rotation;

(d) necessity of taking the spool out of the housing in order to change from left-hand to right-hand operation, in those devices where such change is possible at all;

(e) complexity and high cost of manufacture;

(f) difficulty of adjustment, and inability to predetermine from the outside of the reel exactly what the adjusted condition of the mechanism is;

(g) inability to adjust resistance to spool rotation by externally-mounted knobs which need be rotated less than a full revolution in order to achieve a variation between an extremely high and an extremely low resistance to spool rotation, and which may be associated with indicia on the housing so that the fisherman may pre-set the knobs to known, desired positions.

(h) inability to be adjusted instantly, and without disassembling the reel, for a right-handed or a left-handed fisherman. cl SUMMARY OF THE INVENTION A pawl is pivotally mounted adjacent a clicker gear, the inner end of the pawl being disposed between two teeth of the gear. Spring means are provided in bearing engagement with each side of the pawl. Means, independent of each other, are provided to shift an associated spring means substantial distances along the pawl in order to change the moment arm between the spring means and the pawl axis. The moment arm being changed, the resistance to rotation of the pawl is markedly changed, to thus change both the resistance to turning of the clicker gear and its connected spool, and the sound generated by the clicker gear and pawl.

Stated more specifically, each spring means is a preloaded spring, which is mounted on a slide plate. The slide plate for each spring is shifted by a control knob rotatably mounted in the housing of the reel. An off-center pin connects the control knob to the slide plate at a slot in the latter. Suitable indicia are provided on the housing so that the exact rotated position of the control knob can be predetermined, the fisherman then knowing in advance what the setting of the reel is.

BRIEF DESCRIPTION OF THE DRAWINGS

FIGS. 3, 4 and 5 are plan views of the pawl, spring and adjustment mechanisms, showing different operating positions.

DETAILED DESCRIPTION OF THE PREFERRED EMBODIMENT

Figure 1:
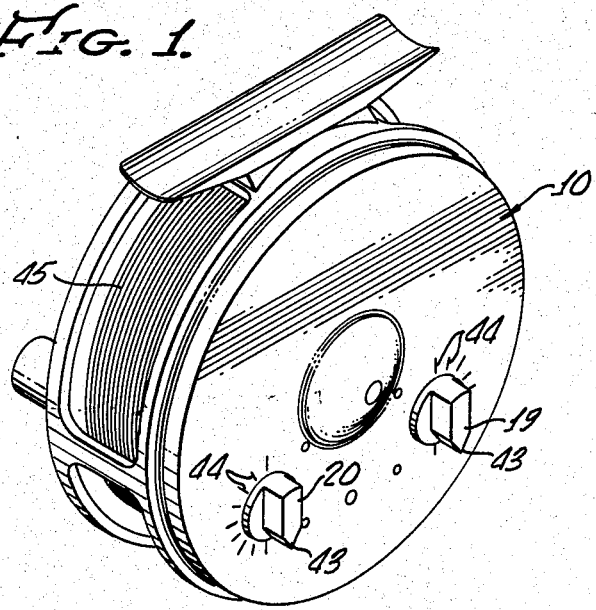
FIG. 1 is an isometric view of a fly-fishing reel incorporating the present invention.
Figure 2:
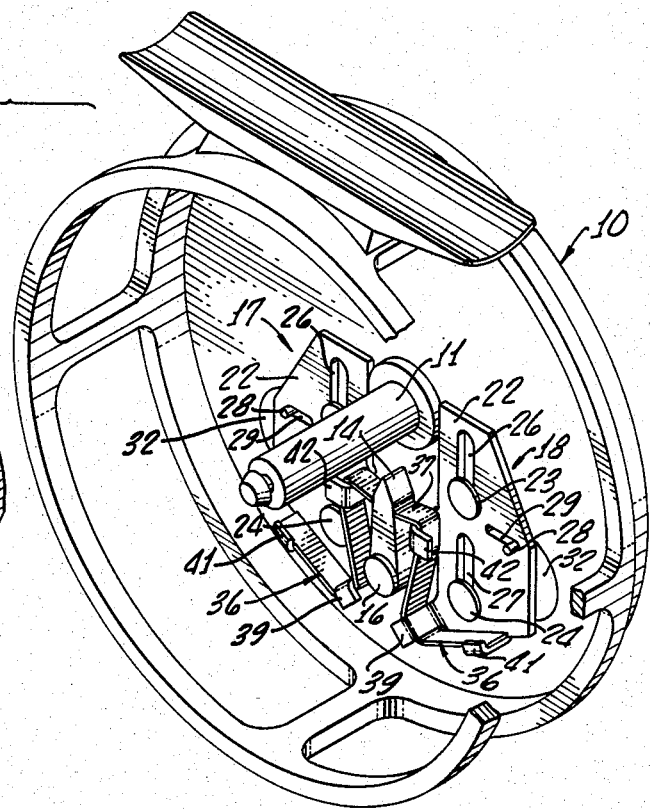
FIG. 2 is an enlarged exploded isometric view showing the pawl, spring and adjustment mechanisms.

Referring to FIGS. 1 and 2, the dual-control fly-fishing reel comprises a housing 10 having fixedly mounted therein, at its axis, a post 11 on which the spool 12 is rotatably mounted. As is conventional with fly-fishing reels, the spool may be removed from the housing by operating a suitable spring-release mechanism.

Mounted fixedly on the inner face of the spool 12 is a clicker gear 13, the gear being coaxial with the bearing opening in the spool. Gear 13 cooperates with a pawl 14 as best shown in FIGS. 3, 4 and 5, the pawl having a pointed inner end seats between adjacent teeth of the gear.

In the illustrated preferred embodiment, pawl 14 is disposed radially of gear 13, extending radially-outwardly thereof to a pivotal connection 16 to housing 10. Such pivotal connection may be, for example, a rivet disposed perpendicularly to the side wall of the housing. Preferably, the side faces of pawl 14, that is to say the left and right faces (FIGS. 3–5) against which the subsequently-described spring means bear, are slightly divergent, in a direction away from gear 13, so that the spring means may move to positions closely adjacent to the axis of pivotal connection 16. This permits spring adjustment to such positions that little or no spring force is exerted on pawl 14.

First and second spring and adjustment mechanisms are provided in association with pawl 14 for controlling the degree of resistance to turning of gear 13 and thus spool 12. For convenience, these first and second mechanisms will be referred to as the "left" and "right" mechanisms 17 and 18, respectively, as viewed in FIGS. 2–5. The left and right mechanisms incorporate, respectively, "left" and "right" drag knobs 19 and 20, respectively, such knobs being disposed on the exterior of the housing 10. It is to be noted that, since FIG. 1 shows the exterior of the housing, whereas FIGS. 2–5 show the interior thereof, the "left" drag knob referred to above and below in this specification is not the one disposed at the left in FIG. 1, being instead the one disposed at the right in such figure only.

The spring and adjustment mechanisms are, in the illustrated preferred embodiment, mirror images about a plane perpendicular to the side wall of body 10 and containing the central axis of pawl 14. Thus, only one such mechanism, namely number 18, will be described in detail, it being understood that the same components and relationships are incorporated in the other mechanism 17 except for the mirror-image relationship.

Mechanism 18 comprises a stamped, sheet-metal slide plate 22 which is mounted in surface engagement with the interior surface of the side wall of housing 10 on the right side of pawl 14. The mounting is effected by two rivets 23 and 24 which extend through the housing side and also through elongated coaxial slots 26 and 27 in the slide plate. The heads of the rivets are sufficiently large to overhang the edges of the slots and thus prevent the slide plate from shifting away from the side wall of the housing.

Slots 26 and 27 are substantially parallel to the adjacent surface of pawl 14, and have lengths substantially equal to the length of the pawl except for the inner end portion thereof (the portion which converges to an edge disposed between adjacent teeth of the clicker gear 13). Thus, rivets 23 and 24 permit slide plate 22 to move upwardly and downwardly through a distance corresponding substantially to the length of the main body of pawl 14.

Slide plate 22, as thus mounted, constitutes part of a rotary-to-linear-mechanism. The remainder of such mechanism is the associated drag knob 20, and a drive pin 28 associated with such knob. Drive pin 28 extends through a slot 29 in slide plate 22, the slot 29 being perpendicular to slots 26, 27 and generally perpendicular to pawl 14. The length of slot 29 is such that the left end thereof (as viewed in FIGS. 2-5) will never be engaged by drive pin 28, while the right end thereof will be engaged by such pin and will therefore constitute a stop which limits the rotation of knob 20.

Stated in greater detail, knob 20 is a plastic element disposed on the exterior of housing 10, and having an interior "button" portion 31 (FIG. 6) which extends a slight distance into an opening in the housing side wall. Coaxial with such opening, and in the interior surface region of the housing side wall, is a relatively large counter bore adapted to receive a thin metal washer 32. The washer does not engage button 31, there being instead a slight space therebetween. A screw 33 is extended outwardly through washer 32 and threaded into button 31 and the associated knob 20. The screw is a tight force-fit in the button and knob. Furthermore, the screw deforms washer 32 sufficiently that the washer will bear against the adjacent surface region of the counterbore in the housing side wall and will thus drag frictionally relative to such side wall.

Figure 6:
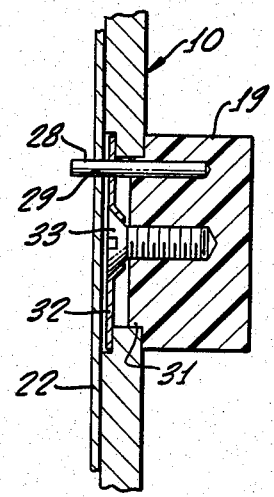
FIG. 6 is an enlarged fragmentary sectional view showing the manner of mounting each drag knob in such a resilient relationship that it will not turn accidentally.

Washer 32 thus prevents knob 20 and the elements connected thereto from shifting accidentally, instead holding them firmly in position until the fisherman turns the knob in order to adjust the slide plate 22 associated therewith. When the knob turns, washer 32 turns with it, because drive pin 28 extends through a hole in the washer 38 and is press-fit into the button 31 (FIG. 6). When knob 20 turns, pin 28 revolves around the axis of the knob and shifts slide plate 22 between its extreme positions.

A flat spring 36 is mounted at the lower-left portion of slide plate 22, having a bent and generally horizontally-extending end portion 37, the extreme end (left end) of which bears against the side wall of pawl 14. Spring 36 is so preloaded that its extreme end is in pressure engagement with the pawl. Such preloading is effected by bending an intermediate portion of the spring 36 around a hook element 39 which is integral with plate 22 as best shown in FIG. 2. The spring end remote from end portion 37 is snapped behind a second hook element 41, being above such element 41 and thus tending to pivot the spring counter-clockwise to preload end 37 against the pawl.

A third hook element, numbered 42, is formed integrally with slide plate 22 adjacent spring end portion 37. This hook element 42 holds the spring in position without, however, preventing the extreme end from bearing against the pawl surface. During rotation of the pawl 14 about its pivot axis, as the clicker gear 13 turns counter-clockwise, the spring moves away from the third hook element 42. When the clicker gear is rotated clockwise, the spring is supported by the hook element 42 and therefore cannot follow the pawl 14.

The illustrated preferred spring is generally Z-shaped, having a short upper region 37, an intermediate region which extends between hook elements 39 and 42, and a relatively long lower region which extends between hook elements 39 and 41.

Knob 20 has an arrow or pointer portion 43 which is associated with suitable markings or indicia 44 on the exterior surface of housing 10. By use of this arrow portion 43 and related indicia, the fisherman may predetermine the setting of pin 28 and thus of the entire spring and adjustment mechanism 18.

OPERATION

As described in detail above, each mechanism 17 and 18 comprises a rotary-to-linear-motion converter, and a spring mounted on such converter for movement therewith. Because each slide plate 22 moves generally parallel to pawl 14, each spring end 37 also moves parallel to pawl 14, preferably for substantially the full length thereof except at the sharpened upper end which engages the clicker gear.

Referring to FIG. 3, slide plate 22 of the right mechanism 18 is in its upper extreme position, while slide plate 22 of the left mechanism 17 is in its lower extreme position. Not only are the slide plates in the described extreme positions, because rivets 23 and 24 (and pin 28) will not let them move further, but the associated knobs 20 and 19 are also in their opposite extreme positions. Thus, for example, knob 19 may not be turned clockwise (as viewed in FIG. 3) past the illustrated position, because its drive pin 28 is bearing against the end of slot 29 in slide plate 22, and rivets 23, 24 prevent the slide plate from moving sideways (that is to say, horizontally to the left). Similarly, knob 20 is prevented from moving clockwise, as viewed in FIG. 3, because its drive pin 28 is bearing against the end of slot 29, and the slide plate 22 in which the slot is provided may not move horizontally to the right because of the presence of rivets 23, 24.

With the mechanisms 17, 18 in the opposite extreme positions shown in FIG. 3, clicker gear 13, and the associated spool 12 (which is shown only in FIG. 2) will have a hard time moving in a counter-clockwise direction as shown in FIG. 3. This is because there is a long moment arm between spring end portion 37 of right mechanism 18, and the axis of rivet 16 which mounts the pawl. There being a long moment arm, the spring 36 of right mechanism 18 has a very large effect tending to prevent clockwise pivoting of pawl 14, which in turn tends to prevent counter-clockwise rotation of clicker gear 13 and the connected pool.

Conversely, there is a very short moment arm between spring end 37, of left mechanism 17, and the axis of rivet 16 when the mechanism 17 is in the extreme position shown in FIG. 3. Thus, pawl 14 may rotate counter-clockwise with relative ease, and this permits clicker gear 13 to rotate clockwise with relative ease.

To summarize, therefore, when the parts are in the FIG. 3 positions, gear 13 may move clockwise very easily and with relatively little clicking noise. However, it may move counter-clockwise only with difficulty and with a relatively large or loud clicking noise.

Referring next to FIG. 4, the knobs 19 and 20 have been so turned as to completely reverse the positions of mechanisms 17 and 18, as compared to the positions shown in FIG. 3. Thus, when the parts are in the FIG. 4 positions, gear 13 may move clockwise with difficulty but may move counter-clockwise with ease.

FIG. 5 shows both mechanisms 17 and 18 adjusted to the same position, namely the one at which opposition by the springs to the pivoting of pawl 14 is substantially minimized. It follows that gear 13 may move in either direction with the same degree of ease and the same clicking sound. This is opposite to the positions of FIG. 2, which show both mechanisms 17 and 18 so adjusted that resistance to pivoting of pawl 14 in both directions is maximized, and the sound is maximized when the spool 13 turns with difficulty.

The present invention therefore provides a relationship whereby opposition to rotation of the gear in opposite directions is independently adjusted. Slide plate 22 of mechanism 18 may be adjusted to any desired position simply by turning its associated knob 20 to a desired position. Slide plate 22 of mechanism 17 may also be adjusted to any desired position, by turning knob 19 to a desired position. The fisherman may achieve any degree of resistance to rotation of gear 13, in either direction.

Such adjustments are made when it is desired to change the resistance to reeling-in of the fishline 45, when it is desired to change the resistance creating drag when the line is pulled out, or when it is desired to shift between left-handed and right-handed fishing.

All of the above is accomplished without the necessity of removing the spool 12 from the housing 10. The only time spool 12 is removed is when it is desired to replace the spool with another one having a different type of line thereon, or when it is desired to lubricate the mechanism 17, 18—which lubrication is advisable at relatively long intervals.

One of the numerous advantages of the invention is that the degree of change in spring pressure on the pawl, and the predictability and repeatability of such change, is much greater than would be the case if the spring were to remain in the same position relative to the pawl and some mechanism provided to change the force exerted by the spring against the pawl.

The foregoing detailed description is to be clearly understood as given by way of illustration and example only, the spirit and scope of this invention being limited solely by the appended claims.

I claim:

1. A fishing reel, which comprises:
   (a) a housing,
   (b) a spool having a clicker gear mounted fixedly and coaxially thereon, said spool being mounted rotatably in said housing,
   (c) a pawl associated with said gear,
   (d) means to pivotally connect said pawl to said housing,
   (e) spring means associated with said pawl to resist pivoting thereof in a predetermined direction and thus cause said pawl to resist turning of said clicker gear and said spool in a predetermined direction, and
   (f) means to effect large changes in the moment arm between the pivot axis of said pawl and the region where said spring means is associated with said pawl, to thus effect large changes in the pivoting and turning resistances stated in clause (e).

2. The invention as claimed in claim 1, in which said means (f) includes manually operated means disposed on the exterior of said housing.

3. The invention as claimed in claim 1, in which second spring means are associated with said pawl to resist pivoting thereof in a direction opposite to said first-mentioned predetermined direction, and thus cause said pawl to resist turning of said clicker gear and said spool in a direction opposite to said second-mentioned predetermined direction, and in which means are provided to shift said second spring means to different positions, said last-named means effecting a major change in the moment arm between the pivot axis of said pawl and the region where said second spring means is associated with said pawl, to thus effect major changes in the pivoting and turning resistances resisting pivoting and turing in said opposite directions.

4. The invention as claimed in claim 1, in which said housing has a side wall perpendicular to the axis of said spool, in which said means (f) comprises a rotary-to-linear-motion converter mechanism, said mechanism comprising a rotary element rotatably mounted in said side wall of said housing, said rotary element being accessible from the exterior of said housing, and a slide plate mounted in the interior of said housing adjacent said side wall, and operated by said rotary element, and constrained so as to move linearly, and in which said means (e) comprises a spring mounted on said slide plate and having a portion engaged with said pawl,
   said spring shifting relative to a surface of said pawl to change said moment arm.

5. The invention as claimed in claim 4, in which said rotary-to-linear-motion converter includes a drive pin mounted eccentrically in said rotary element and projecting through a slot in said slide plate.

6. The invention as claimed in claim 5, in which a drag spring is interposed between said rotary element and said slide plate for dragging on an interior surface region of said housing, said drag spring having a hole therein through which said pin projects to thus cause said drag spring to rotate with said rotary element.

7. The invention as claimed in claim 4, in which indicia are provided on the exterior of said housing to permit the position of said rotary element to be predetermined.

8. A fly-fishing reel, which comprises:
   (a) a housing,
   (b) a spool having a clicker gear mounted fixedly and coaxially thereon, said spool being mounted rotatably in said housing,
   (c) a pawl,
   (d) means to pivotally connect said pawl to said housing, said pawl extending radially of said gear, and having an inner end engaged with said gear, the point of pivotal connection of said pawl to said housing being spaced away from said gear, said pawl having opposite side surfaces near which springs may shift toward and away from said gear, to change the moment arms tending to resist pivoting of said pawl in one direction or the other,
   (e) first and second springs disposed on opposite sides of said pawl and respectively near said opposite side surfaces,
   (f) first and second means, independent of each other, to move said respective springs toward and away from said gear, and (g) means provided in association with each of said springs to preload the same and also to prevent each of the associated springs from following said pawl when said spool is rotating in a predetermined direction, the relationships being such that only one of said springs is operatively associated with said pawl when said spool rotates in one direction, and only the other of said springs is operatively associated with said pawl when said spool rotates in the opposite direction.

9. The invention as claimed in claim 8, in which said means (f) comprise slide plates mounted on opposite sides of said pawl, each slide plate having one of said springs thereon in preloaded relationship, and further comprise rotary means accessible from the exterior of said housing to shift said slide plates by desired amounts.

10. A fishing reel, which comprises:
(a) a housing,
(b) a spool having a clicker gear mounted thereon, said spool being mounted rotatably in said housing,
(c) means, engaged with the teeth of said gear at a predetermined point, to resist rotation of said gear and to create a clicking sound, and
(d) means to change drastically the degree of resistance created by said means (c), and the volume of said sound,
said last-named means including a spring associated with said means (c),
said last-named means also including means to change the region of association between said spring and said means (c) between a first position at which said point of association is close to said gear, a second position at which said point of association is remote from said gear, and various positions intermediate said first and second positions.

11. A fishing reel, comprising:
(a) a spool,
(b) support and bearing means to rotatably support said spool,
(c) clicker-gear means associated with said spool for rotation therewith,
(d) pawl means having inner-end means engaged with the teeth of said gear means,
(e) pivot means to pivotally connect said pawl means to said support and bearing means, said pivot means being so positioned that at least a substantial portion of said pawl means is interposed between said pivot means and said teeth,
(f) spring means to act on said pawl means and resist pivoting thereof in response to rotation of said spool, and
(g) means to shift, to substantially different points along said pawl means, the region where said spring means acts on said pawl means, said shifting changing the moment arm of said spring means relative to said pawl means and, accordingly, the mechanical advantage of said spring means relative to said pawl means, said change in moment arm and mechanical advantage effecting a large change in the amount of resistance presented by said pawl means to turning of said gear means, and thereby effecting a large change in the resistance presented to turning of said spool.

12. The invention as claimed in claim 11, in which said shifting means (g) includes actuating means located on a side of said support and bearing means, remote from said spool, whereby the operator may easily effect shifting of said region where said spring means acts on said pawl means, to thus readily control the clicking and the degree of drag on said spool.

13. The invention as claimed in claim 11, in which said spring means comprises two springs located one on each side of said pawl means, and in which said shifting means includes means to effect shifting of each of said two springs independently of the other, to thus independently control the clicking action and the turning resistance when said spool turns in opposite directions.

14. The invention as claimed in claim 13, in which means are provided in association with each of said springs to preload the same and also to prevent each of the associated springs from following said pawl means when said spool is rotating in a predetermined direction, whereby one of said springs is operative when said spool rotates in one direction, and the other of said springs is operative when said spool rotates in the opposite direction.

15. The invention as claimed in claim 13, in which said means to effect shifting of each of said two springs comprises two slide plates mounted on said support and bearing means, one plate on each side of said pawl means, in which each of said two springs is mounted on one of said slide plates in preloaded relationship, each such spring having an end positioned to engage a side of said pawl means, the preloading means on each slide plate including means to prevent said end from engaging said pawl means when said spool is turning in a predetermined direction.

16. The invention as claimed in claim 15, in which first and second rotary actuators are mounted on said support and bearing means in positions at all times accessible to the operator, said rotary actuators being connected one to one of said slide plates, and the other to the other of said slide plates, by rotary-to-linear motion converters, each of said rotary actuators thus being able to shift one of said slide plates to an infinite number of positions along said pawl means, thus achieving convenient and full and independent control of the clicker action and the spool-turning resistance regardless of the direction of spool rotation.

17. The invention as claimed in claim 11, in which means are provided to preload said spring means recited in clause (f), so that a relatively small amount of shifting of said pawl means is resisted by a large force by said spring means.

18. The invention as claimed in claim 1, in which means are provided to preload said spring means and, additionally, to prevent said spring means from following said pawl when said clicker gear and said spool are turning in a direction opposite to said second-mentioned predetermined direction.

19. The invention as claimed in claim 3, in which means are provided to preload said spring means and, additionally, to prevent said spring means from following said pawl when said clicker gear and said spool are turning in a direction opposite to said second-mentioned predetermined direction, and in which means are provided to preload said second spring means and, additionally, to prevent said second spring means from following said pawl when said clicker gear and said spool are turning in said second-mentioned predetermined direction.

* * * * *